United States Patent [19]

Hadley et al.

[11] 3,917,212

[45] Nov. 4, 1975

[54] CROSS ARM MIRROR MOUNT FOR REMOTE CONTROL REARVIEW MIRRORS

[75] Inventors: Richard Marshall Hadley, Jackson, Tenn.; Robert James Fisher, Detroit, Mich.

[73] Assignee: Harman International Industries, Inc., Detroit, Mich.

[22] Filed: Dec. 3, 1973

[21] Appl. No.: 421,399

[52] U.S. Cl. .............................. 248/487; 74/501 M
[51] Int. Cl.$^2$............................................. A47G 1/24
[58] Field of Search..... 74/501 M; 248/487; 403/57, 403/58

[56] References Cited
UNITED STATES PATENTS

| | | | |
|---|---|---|---|
| 2,570,735 | 10/1951 | Weise ................................... | 403/58 |
| 2,899,225 | 8/1959 | Birr........................................ | 403/58 |
| 3,021,756 | 2/1962 | Milton et al. .................... | 248/487 X |
| 3,263,800 | 8/1966 | Vissers.............................. | 403/57 X |
| 3,370,479 | 2/1968 | VanNoord ...................... | 248/487 X |
| 3,780,598 | 12/1973 | Menger............................ | 74/501 M |
| 3,800,619 | 4/1974 | McIntyre........................... | 74/501 M |

*Primary Examiner*—William H. Schultz
*Attorney, Agent, or Firm*—Miller, Morriss, Pappas & McLeod

[57] ABSTRACT

An improved cross arm mirror mount for open faced mounting of remote control rearview mirrors and the like which provides universal two axis journal support between the mirror back on one side and the mounting pedestal on the other in such a manner that the two transverse axes intersect. The cross arm element is compressed between the pedestal and the mirror back by tension in the control cables or wires. Since the axes in the present invention cross in a common intersecting point, minimum space is required between pedestal and mirror for the mounting means and this eliminates uncertainties of performance arising from variations in distance between the journals on one axis and the offset journals on the other axis. In the present cross arm mount, both axes are located substantially close to the plane of the mirror back.

3 Claims, 3 Drawing Figures

CROSS ARM MIRROR MOUNT FOR REMOTE CONTROL REARVIEW MIRRORS

The present invention is a substantial improvement over the cross arm mirror mount expressed in the application for U.S. Letters Patent of John E. Mills, titled "Cross Arm Mirror Mount" and bearing Ser. No. 403,192 filed on Oct. 3, 1973. While the principal object of the present invention is identical with the object in the Mills application, to provide a universal support for remote control automotive mirrors while restraining rotational tendencies in the plane of the glass, the present invention seeks to provide intersecting control axes so that performance variances by virtue of variant lengths to bearings or pivots are avoided along with eccentric tendencies and so that the spacing between support pedestal and mirror back is minimized and the journalling most closely approaches the plane of the mirror glass. These objects all tend to enhance mirror stability while providing low cost and reduction of previously required precision at mounting. The mounting element is a one-piece structure easily die cast or otherwise formed to include bearing elements in two control axes, one axis intersecting the other, as projected.

THE PRIOR ART

Early remote control rearview mirrors achieved set stability by friction introduced into the structure by the tension created in the cables and manifesting itself in compression on the various journal elements and in particular, the spheroidal engagement as between the universal pivot pins and the actuator and mirror elements. In general, such structures were retaining a round mirror and support was maintained at the center back. Asymmetric mounting, as in rectangular, oblong, or irregular shaped mirror glass gave rise to new problems of support of the mirror surfaces against rotation in the plane of the glass and the simple spherical universal pivot required replacement or supplemental support. The early mounts are characterized in the U.S. Pat. No. 2,931,245 to Jacobson. These were followed by the mounting supplements as seen in U.S. Pat. Nos. 3,655,273, 3,283,607 and in the arc gear approaches suggested in U.S. Pat. Nos. 3,251,238 and 2,614,437. In the trade, a crescent segment structure with flanking pairs of spherical pivots made its appearance. Then the Mills Cross Arm Mount, Ser. No. 403,192 appeared. The present structure takes a substantial step further than the known art.

Aside from stabilization of the mirror from rotation in its own plane, the objects include simplicity, economy, and self-adjustment to wear while coming closest than any known commercial device to a function approximating that of a spherical universal pivot mounting. The effective pivot point is the intersection between the two transverse axes.

GENERAL DESCRIPTION

In general, the invention is a pivotal mounting element placed between a mirror back and support pedestal to establish a pair of intersecting bearing axes, one occurring resting against one surface thereof and allowing rotation on the first axis and the other intersecting axis supporting the other or second axis and allowing rotation on the second axis. Hence, the two axes in the pivotal mounting element all lie in the same plane and by virtue of the two transverse axes in the same plane, the plane can approach being on the plane of the mirror back thus reducing the cantilever problem attending mirror support. In brief, there is a substantial reduction in the space required between pedestal and mirror surface or back. The structure of the pivotal mounting element is such that it rests in open journals provided in the mirror back and in the pedestal. Assembly is maintained by tension in the control wires or cables urging the mirror in the direction of the pedestal and sandwiching the pivotal element therebetween while permitting universal movement as between the fixed pedestal and the movable mirror.

While specifically intended for use in a remote controlled rearview mirror of the cable type, the presently described pivotal mounting is adaptable to any universally movable structure where pedestal and back are in compression on a universal structure, such as in spotlights, remote manipulation devices and the like.

SPECIFIC DESCRIPTION

Figure 1:
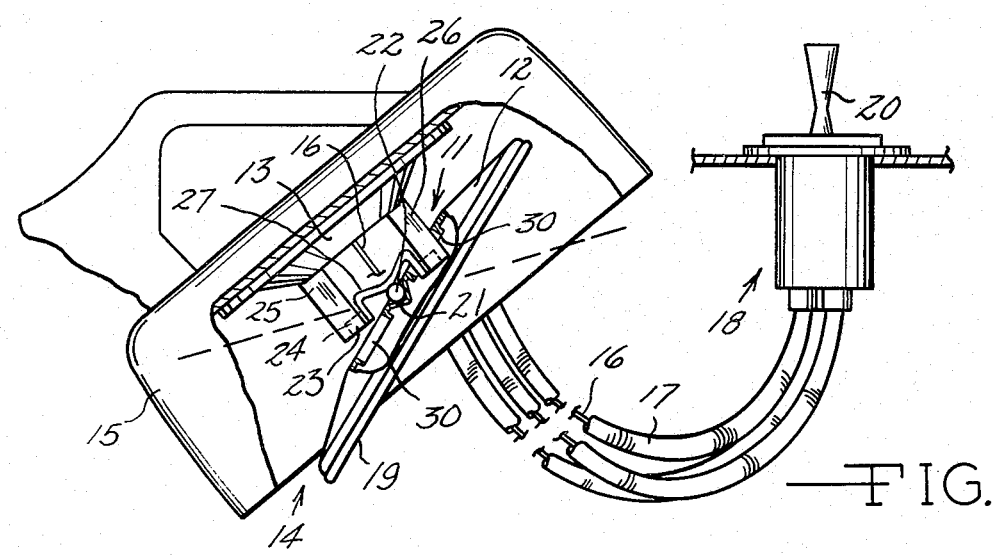
FIG. 1 is a top plan view partially cut away, of a remote control rearview mirror and actuator and revealing the cross arm mirror mount of the present invention sandwiched between mirror back and pedestal.

Referring to the drawing and most specifically the FIG. 1 thereof, the cross arm mirror mount 11 is seen to provide a universal journalling as between the mirror back 12 and the support pedestal 13 in a remote control rearview mirror 14 in the decorative housing 15. Cables or core wires 16 inside the sheaths 17 extend between the remote control mirror 14 and the remotely positioned actuator 18. The cables 16 are tensioned as by resilient means shown, for example, in U.S. Pat. No. 2,931,245. Accordingly, the tensioned cables 16 pass into the housing 15, through the pedestal 13 and are terminally connected to the mirror back 12. The sheaths 17, as will be seen, are socketed in the pedestal 13 and the tension in the cables 16 draws the mirror back 12 into journal contact with one axis of the cross arm mirror mount 11 and urges the other axis of the cross arm mirror mount 11 into journal contact with the pedestal 13. In addition, it will be appreciated that the two axes of the cross arm mirror mount 11, when projected, intersect each other at a point establishing a universal center around which universal movement of the mirror 19 can occur in mimicry of the movement of the actuator handly 20 at the actuator or control 18. This occurs because the tensioned cables 16 move in accord with movement of the handle 20 in actuator 18. The mirror glass 19 is supported by the mirror back 12 and the mirror back 12 includes a groove or trough 21 which journals the shaft 22 of the cross arm element 11. The shaft 23, transverse to the shaft 22 and having its axis intersecting the axis of shaft 22 is supported in grooves or troughs 24 provided in the pedestal 13. The grooves or troughs 24 are provided in the ends of the projections 25 and 26 of the pedestal 13. The web 27, integrally connecting the shafts 22 and 23 provides an offset connection so that the shaft 23 is gapped at the center, as shown in the manner of two stub shafts on a common axis so that the shaft 23 and the projections 25 and 26 of the pedestal 13 are given limited clearance for relative movement around the axis of the shaft 22 by entry into one or the other of the clearance openings 30 as shown in the FIG. 1. Thus the mirror back 12 in metal or resin grips the mirror glass 19 and at the rear of the mirror glass 19 the back 12 is spaced away from the mirror glass 19 a distance to accommodate attachment of the plural cables 16 (usually three) to accommodate the trough or groove 21 and to provide for the clearance spacing of the openings 30 allowing limited entry of the projections 25 and 26 of the pedestal 13 therethrough in the extremes of manipulation. The glass 19 is secured to the back 12 as by peripheral crimping, by adhesives, or by other well known mounting means. In the FIG. 2, the cross arm mirror mount 11 is seen securely cradled in the open troughs of the grooves 24 and 21 in the pedestal 13 and mirror back 12, respectively, and retained there by the tensioned cables 16. The pedestal 13 sockets the ends of the sheaths 17 in buttress relation while the cables 16 pass through and are connected to the mirror back 12 as by the ferrules 31 as shown in hidden edge line.

Figure 2:
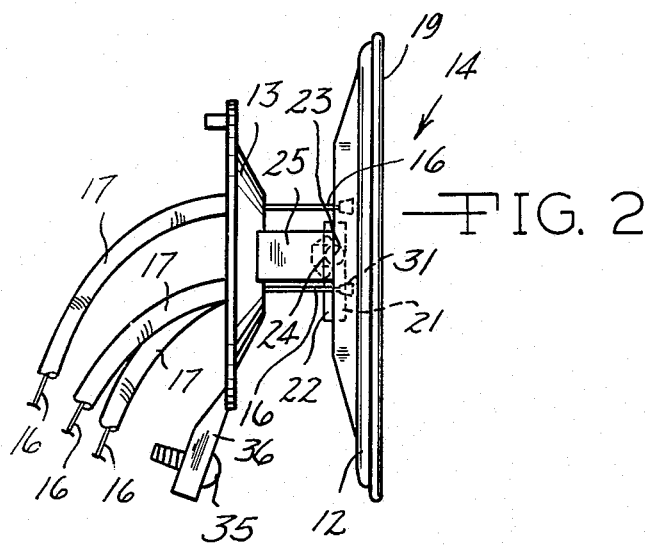
FIG. 2 is a side elevation view of the pedestal removed from the mirror shroud as seen in FIG. 1 and with the cross arm mirror mount in universal support of the mirror in engagement with pedestal and mirror back.

As can be seen in the FIG. 2, the intersection of the axes of the shafts 22 and 23 occurs substantially in the plane of the mirror back 12 and the grooves 21 and 24 provide a support for the mirror 19 that avoids rotation of the mirror 19 in the plane of the mirror 19 while allowing necessary limited universal movement of the mirror 19 in accord with manipulation of the cables 16 running under tension in the sheaths 17. This provides unusually good stability since the universal center point is located substantially at or adjacent the center of gravity in construction of mirror back 12 and mirror 19. In addition, eccentric tendencies are avoided which have resulted where the mounting axes are offset from each other. This results in minimum clearance requirements at the mount 11 and permits a compact relation in the remote control mirror 14.

The pedestal 13 is secured to the housing 15 as by the fastener 35 running through the mounting tongue 36. However, the pedestal 13 may be integrally formed in the housing 15.

Figure 3:
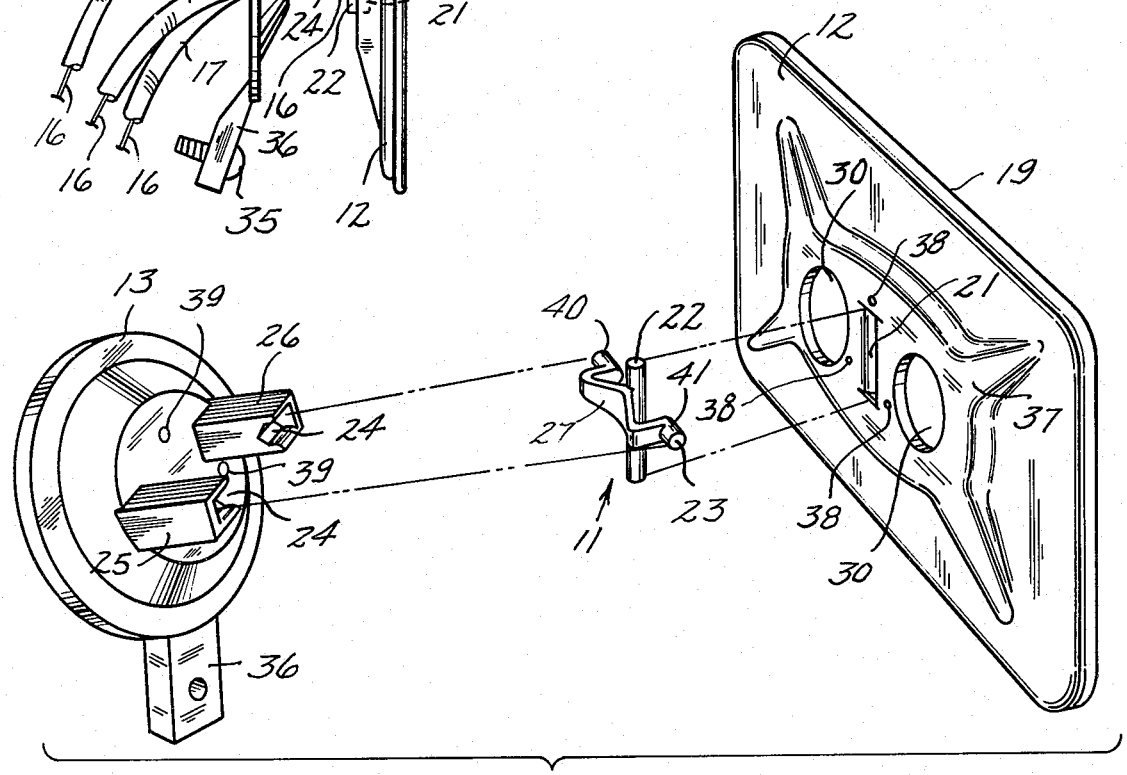
FIG. 3 is an exploded view of a pedestal mount, a mirror back and the cross arm support element and indicating the universal connection of the mirror back to the cross arm element of the present invention and with cables or wires removed for clarity.

In the FIG. 3, the mirror back 12 and pedestal 13 are seen in assembly relation on each side of the cross arm mirror mount 11 and the clearance openings 30 in the raised embossed portion 37 of the mirror back 12 are clearly seen flanking the journal groove 21. The cable openings 38 are visible in the mirror back 12 symmetrically clustered around the groove 21 and these openings 38 are in spaced apart general registry with the openings 39 in the pedestal 13. The projections from the pedestal 13 are seen to include the groove 24 at the ends thereof for journal support of the shaft 23 in the form of gapped stubs 40 and 41 connected to the shaft 22 by means of the web 27. When the cables 16 are secured to the back 12 as by the ferrules 31 (seen in FIG. 2) at the terminal ends of the cables 16 and are tensioned, then the mirror back 12 closes on the cross arm mount 11 securing it in the grooves 21 and 24 against the shafts 22 and 23. Movement on the axis of the shafts 22 and 23 is prevented by the buttress ends of the troughs or grooves 21 and 24 and by the web 27 which extends between the projections 25 and 26. Such an arrangement stabilizes the mirror 19 against movement in the plane of the mirror 19 and at the same time reduces cumulative clearance problems between pedestal 13 and mirror back 12. In the FIG. 3 the projection lines indicate the journal nesting relationship of the shaft 23 in the groove 24 and the shaft 22 in trough 21.

OPERATION

In operation, the cross arm mounting 11 brings excellent stability to the mirror head 14 on the open pivots comprising shafts 22 and 23 resting in journal relation in the transverse grooves 21 and 24 and universally moveable on a common center where the axes of shafts 22 and 23, as projected, intersect. The universal motion approximates the result of a ball socket, the center of which is located substantially in the plane of the mirror back 12 and ample clearance is provided to allow limited universal movement as desired. The mount 11 is integral in resin or metal formed by injection molding, die casting, or the like. The grooves 21 and 24 are similarly formed except that where the mirror back 12 is a stamping, then the groove 21 is inserted, while forming the embossed portion 37.

Having thus described our invention and one specific operative embodiment thereof, others skilled in the art will appreciate obvious modifications, changes and improvements as adapting the structure to variant environments and such changes, modifications and improvements are intended to be included herein limited only to the scope of the hereinafter appended claims.

We claim:

1. A cross arm structure for limited universal support of remote controlled rearview mirrors and the like comprising:

a mirror back having an elongate grooved depression;

a pedestal mount having a pair of spaced-apart coaxial grooves;

a one piece structure having a first cylindrical element and defining a first axis engaged in said groove of said mirror back and said one piece structure having a second axis defined by a pair of spaced-apart coaxial cylindrical elements which, upon projection, intersects said first axis at right angles thereto and said pair of spaced-apart cylindrical elements resting in said grooves of said pedestal, one or more of said grooves restraining axial displacement of said one piece structure; and tension means compressing said one piece structure between said mirror back and said pedestal.

2. A remote controlled rearview mirror or the like comprising:

a cross arm structure including a first cylindrical portion having a central web connection to a second cylindrical portion having an axis transverse of the axis of said first cylindrical portion and the axes of said cylindrical portions as projected intersecting at a common point in space;

a mirror back having a groove formed therein and into which said first cylindrical portion is nested for rotational movement and a pair of recesses flanking said groove;

a support pedestal having a pair of spaced apart protuberances, each of said protuberances having a groove on a common axis and said grooves receiving said second cylindrical portion for rotational movement therein; and tension means connected to said mirror back and drawing said mirror back toward said pedestal and compressing said cylindrical portions therebetween.

3. In a remote control rearview mirror of the tensioned cable type, the universal pivot construction intermediate the mirror back and support pedestal comprising:
- a first cylindrical shaft;
- a second cylindrical shaft at right angles to said first cylindrical shaft, the projected axis of said second shaft intersecting the axis of said first shaft;
- a web portion integral with said first shaft and said second shaft whereby said second shaft is gapped at the center;
- a trough in said mirror back journalling said first shaft;
- a trough in said support pedestal journalling said second shaft; and
- means compressing said shafts against and into said troughs.

* * * * *